United States Patent
Nakamura

(10) Patent No.: US 6,295,349 B1
(45) Date of Patent: Sep. 25, 2001

(54) EXCHANGE

(75) Inventor: Masayasu Nakamura, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/247,934

(22) Filed: Feb. 11, 1999

(30) Foreign Application Priority Data

Feb. 12, 1998 (JP) .................................................. 10-048805

(51) Int. Cl.[7] ....................................................... H04J 3/12
(52) U.S. Cl. ........................... 379/201; 370/522; 370/524
(58) Field of Search ................................... 379/201, 207; 370/264, 265, 463, 522, 524

(56) References Cited

U.S. PATENT DOCUMENTS

| 5,521,965 | * | 5/1996 | D'Alessio et al. | 379/201 |
| 5,828,744 | * | 10/1998 | Nemoto | 379/215 |
| 5,943,408 | * | 8/1999 | Chen et al. | 379/207 |
| 5,946,319 | * | 8/1999 | Kobayashi | 370/522 |
| 6,141,343 | * | 10/2000 | Nagayama et al. | 370/357 |

FOREIGN PATENT DOCUMENTS 6-070034 3/1994 (JP) .

* cited by examiner

*Primary Examiner*—Creighton Smith
*Assistant Examiner*—William J. Deane, Jr.
(74) *Attorney, Agent, or Firm*—Venable; Robert J. Frank; Allen Wood

(57) ABSTRACT

An exchange executes a reserved camp-on. For executing the camp-on, the exchange monitors idle/busy states of telephones for which the camp-on is reserved, as well as idle/busy states of corresponding channels. When it is judged that the foregoing telephones and the corresponding channels are all idle, the exchange executes the camp-on.

5 Claims, 4 Drawing Sheets

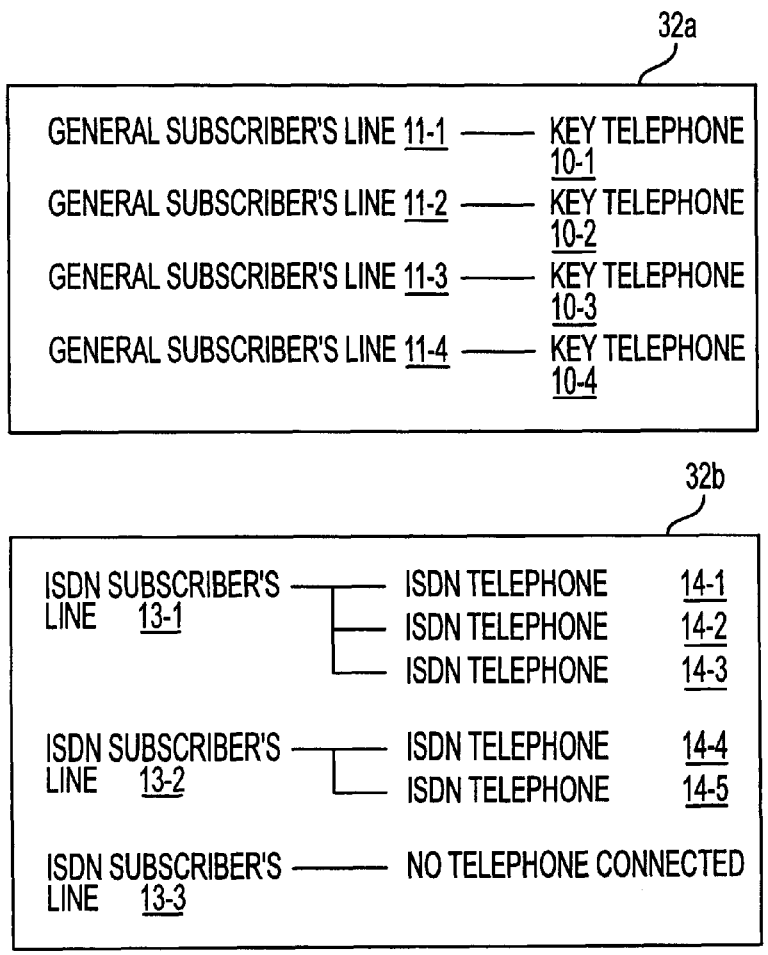
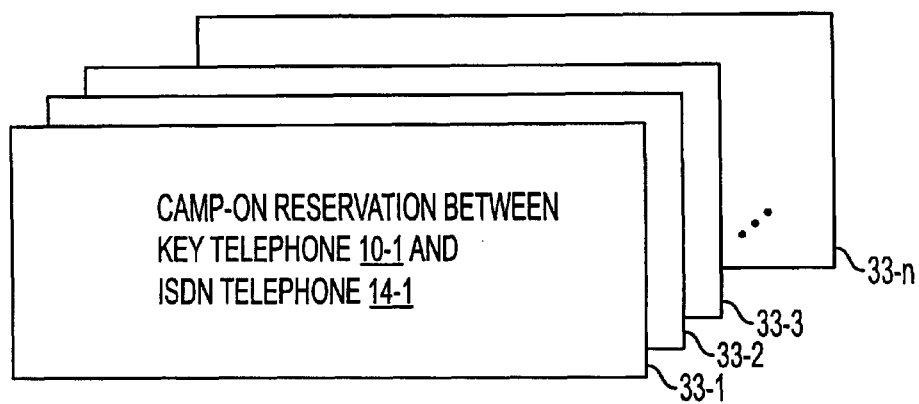
FIG. 4
FIG. 5

EXCHANGE

BACKGROUND OF THE INVENTION

1. Field of the Invention

The present invention relates to an exchange for executing connections among a plurality of terminals via a plurality of communication channels.

2. Description of the Related Art

As one of functions carried out by an exchange, there has been available a camp-on function. According to the camp-on function, when a certain terminal (calling terminal) makes a call to another terminal (called terminal) while the called terminal is used or busy, the calling terminal reserves at an exchange a connection, i.e. a camp-on, between itself and the called terminal and, when the called terminal becomes idle, the exchange calls up the called terminal and then the calling terminal so as to execute the reserved connection, i.e. the reserved camp-on. In general, each terminal is allocated one communication channel independently. Thus, when a certain terminal is used, it means that a channel for that terminal is also used. Under these circumstances, the conventional exchange only monitors whether each terminal is used or not, for carrying out the reserved camp-on.

Recently, however, one channel is shared by a plurality of terminals for efficient utilization of the channel, or one terminal uses two or more channels for the speed-up of communication. Therefore, it may take place that although a camp-on-reserved calling or called terminal is idle, a corresponding channel is used by another terminal, or that although a channel is idle, a corresponding camp-on-reserved calling or called terminal is busy.

As described above, since the conventional exchange merely monitors whether each terminal is used or not, there has been a problem that it is difficult to reliably execute the reserved camp-on.

SUMMARY OF THE INVENTION

Therefore, it is an object of the present invention to provide an improved exchange which can overcome the foregoing problem.

According to one aspect of the present invention, there is provided an exchange for executing a reserved connection between a first and a second terminal, the first terminal having a first channel for communication, the second terminal being one of a plurality of terminals having a second channel for communication shared by the plurality of terminals, the exchange comprising a first judging circuit for judging whether each of the first and second terminals is busy or idle; a second judging circuit for judging whether the second channel is busy or idle; and an execution circuit for executing the reserved connection when the first judging circuit judges that the first and second terminals are both idle and the second judging circuit judges that the second channel is idle.

It may be arranged that the execution circuit gives priority to starting of communication using the second channel by one of the plurality of terminals other than the second terminal, over execution of the reserved connection.

It may be arranged that the execution circuit gives priority to execution of the reserved connection over starting of communication using the second channel by one of the plurality of terminals other than the second terminal.

It may be arranged that the second channel is an ISDN channel.

According to another aspect of the present invention, there is provided a private branch exchange for executing a reserved connection between a first and a second terminal, the first terminal having a first channel for communication, the second terminal being one of a plurality of terminals having a second channel for communication shared by the plurality of terminals, the private branch exchange comprising a first judging circuit for judging whether each of the first and second terminals is busy or idle; a second judging circuit for judging whether the second channel is busy or idle; and an execution circuit for executing the reserved connection when the first judging circuit judges that the first and second terminals are both idle and the second judging circuit judges that the second channel is idle.

BRIEF DESCRIPTION OF THE DRAWINGS

The present invention will be understood more fully from the detailed description given hereinbelow, taken in conjunction with the accompanying drawings.

In the drawings:

FIG. 4 is a diagram showing line-terminal maps to be used in the exchange;

FIG. 5 is a diagram showing camp-on schedules to be used in the exchange;

FIG. 7 is a sequence chart showing an operation of the exchange system, wherein a call process is given priority over execution of a camp-on.

DESCRIPTION OF THE PREFERRED EMBODIMENT

Now, an exchange system including an exchange according to a preferred embodiment of the present invention will be described with reference to FIGS. 1 to 7. In this embodiment, the exchange is in the form of a private branch exchange.

Figure 1:
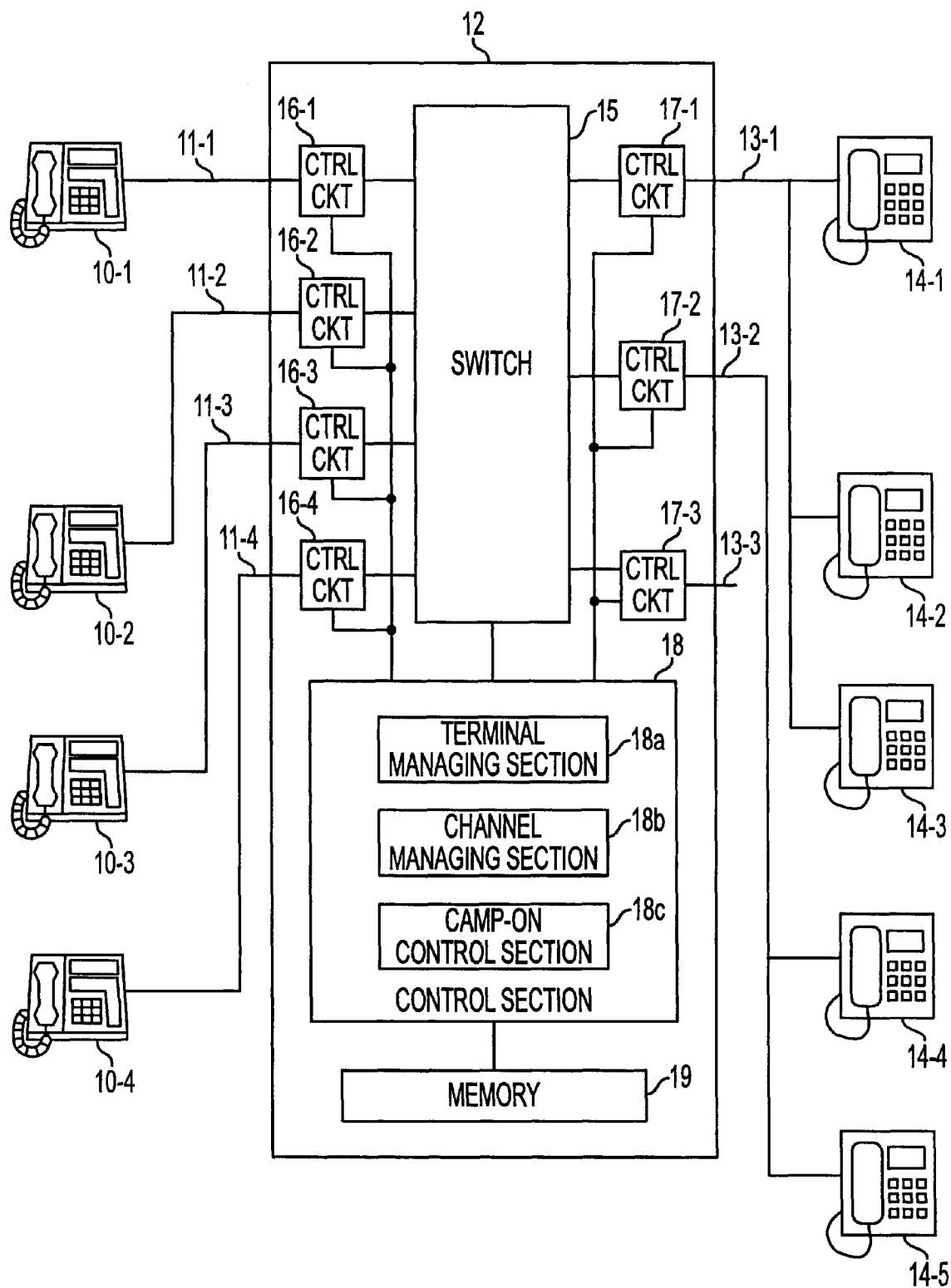
FIG. 1 is a block diagram showing a structure of an exchange system including an exchange according to a preferred embodiment of the present invention.

As shown in FIG. 1, the exchange system comprises key telephones 101 to 10-4, general subscriber's lines 11-1 to 11-4 corresponding to the key telephones 10-1 to 10-4, respectively, a private branch exchange 12, ISDN telephones 14-1 to 14-5, an ISDN subscriber's line 13-1 shared by the ISDN telephones 14-1 to 14-3, an ISDN subscriber's line 13-2 shared by the ISDN telephones 14-4 and 14-5, and an ISDN subscriber's line 13-3 to which no ISDN telephones are connected. The private branch exchange 12 is located in a company, a business office, a plant or the like, and the key telephones 10-1 to 10-4 and the ISDN telephones 14-1 to 14-5 function as extensions therewithin. The key telephones 10-1 to 10-4 are connected to the private branch exchange 12 via the general subscriber's lines 11-1 to 11-4, while the ISDN telephones 14-1 to 14-5 are connected to the private branch exchange 12 via the ISDN subscriber's lines 13-1 and 13-2.

The general subscriber's lines 11-1 to 11-4 and the ISDN subscriber's lines 13-1 to 13-3 differ from each other in that each of the general subscriber's lines provides a transmission capacity for one channel, while each of the ISDN subscriber's lines provides a transmission capacity for 2 or 23 channels (in this embodiment, each of the ISDN subscriber's lines 13-1 and 13-2 provides the capacity for 2 channels while the ISDN subscriber's line 13-3 for 23 channels). The key telephones 10-1 to 10-4 and the ISDN telephones 14-1 to 14-5 differ from each other in that each of the key telephones monopolizes the corresponding general subscriber's line, while the ISDN telephones share the corresponding ISDN subscriber's lines.

The private branch exchange 12 is located between the key telephones 10-1 to 10-4 and the ISDN telephones 14-1 to 14-5 for connection between them. The private branch exchange 12 comprises a switch 15, subscriber control circuits 16-1 to 16-4, ISDN subscriber control circuits 17-1 to 17-3, a control section 18 and a memory 19.

Under the control of the control section 18, the switch 15 performs connections between the key telephones 10-1 to 10-4 and the ISDN telephones 14-1 to 14-5 and further performs connections between these extensions 10-1 to 10 10-4 and 14-1 to 14-5 and outside-line telephones (not shown).

Under the control of the control section 18, each of the subscriber control circuits 16-1 to 16-4 sends and receives control signals with respect to the corresponding key telephone when the corresponding key telephone makes a call or receives a call, and relays speech signals between the corresponding key telephone and the switch 15 while the corresponding key telephone is in communication.

The ISDN subscriber control circuits 17-1 to 17-3 function similarly to the subscriber control circuits 16-1 to 16-4. Specifically, under the control of the control section 18, each of the ISDN subscriber control circuits 17-1 to 17-3 sends and receives control signals with respect to the corresponding ISDN telephone when the corresponding ISDN telephone makes a call or receives a call, and relays speech signals between the corresponding ISDN telephone and the switch 15 while the corresponding ISDN telephone is in communication.

The control section 18 performs various controls for switching operations. Specifically, in the control section 18, a CPU (not shown) executes a program for the switching operations stored in a ROM (not shown) and, during the execution of the program, reads and writes data necessary for the switching operations from and into the memory 19.

The control section 18 comprises a terminal managing section 18a, a channel managing section 18b and a camp-on control section 18c. The terminal managing section 18a manages idle/busy states of the telephones 10-1 to 10-4 and 14-1 to 14-5 using terminal idle/busy maps 30a and 30b shown in FIG. 2. The channel managing section 18b manages idle/busy states of the channels using channel idle/busy maps 31a-1 to 31a-4 and 31b-1 to 31b-3 shown in FIG. 3. The camp-on control section 18c controls camp-on execution (execution of a reserved connection or camp-on) using the terminal idle/busy maps 30a and 30b, the channel idle/busy maps 31a-1 to 31a-4 and 31b-1 to 31b-3, line-terminal maps 32a and 32b shown in FIG. 4, and camp-on schedules 33-1 to 33-n shown in FIG. 5.

The terminal idle/busy maps 30a and 30b, the channel idle/busy maps 31a-1 to 31a-4 and 31b-1 to 31b-3, the line-terminal maps 32a and 32b and the camp-on schedules 33-1 to 33-n are stored in the memory 19.

Figure 2:
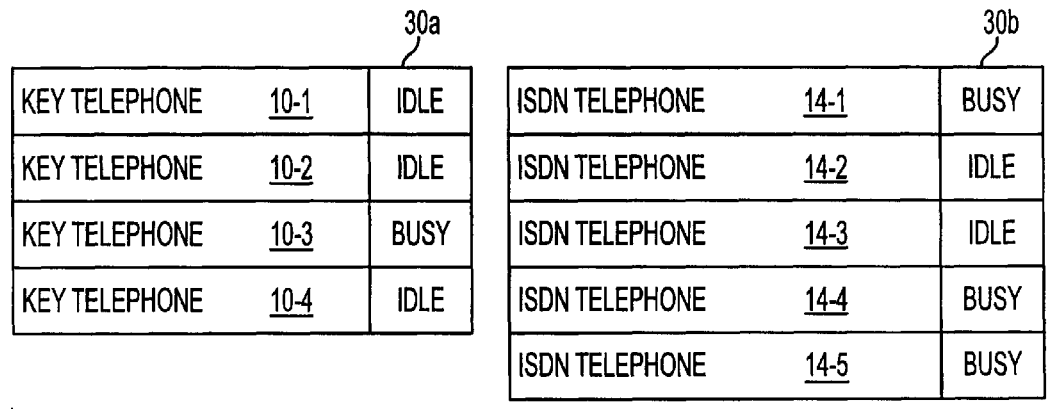
FIG. 2 is a diagram showing terminal idle/busy maps to be used in the exchange.

As shown in FIG. 2, the terminal idle/busy map 30a shows whether the key telephones 10-1 to 10-4 are used or not (busy or idle), respectively, while the terminal idle/busy map 30b shows whether the ISDN telephones 14-1 to 14-5 are used or not, respectively. For example, FIG. 2 shows the state wherein the key telephones 10-1, 10-2, 10-4 and the ISDN telephones 14-2 and 14-3 are not used, while the key telephone 10-3 and the ISDN telephones 14-1, 14-4 and 14-5 are used.

Figure 3:
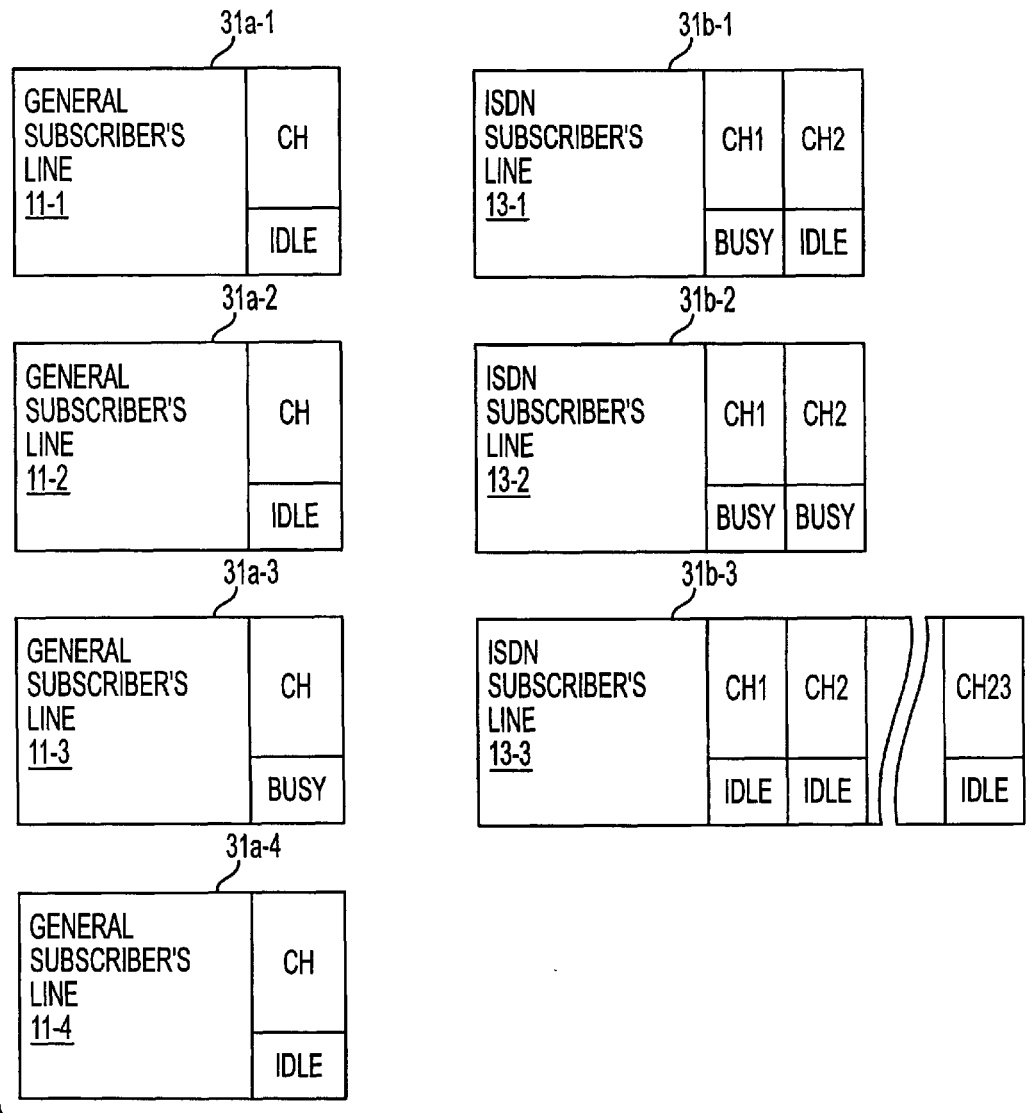
FIG. 3 is a diagram showing channel idle/busy maps to be used in the exchange.

As shown in FIG. 3, the channel idle/busy maps 31a-1 to 31a-4 correspond to the general subscriber's lines 11-1 to 11-4, respectively, and show whether channels of the corresponding general subscriber's lines 11-1 to 11-4 are used or not, respectively. Similarly, the channel idle/busy maps 31b-1 to 31b-3 correspond to the ISDN subscriber's lines 13-1 to 13-3, respectively, and show whether channels of the corresponding ISDN subscriber's lines 13-1 to 13-3 are used or not, respectively. For example, FIG. 3 shows the state wherein channels of the general subscriber's lines 11-1, 11-2, 11-4, a channel 2 of the ISDN subscriber's line 13-1 and all channels 1 to 23 of the ISDN subscriber's line 13-3 are not used, while a channel of the general subscriber's line 11-3, a channel 1 of the ISDN subscriber's line 13-1 and channels 1 and 2 of the ISDN subscriber's line 13-2 are used.

As shown in FIG. 4, the line-terminal map 32a shows correspondence between the general subscriber's lines 11-1 to 11-4 and the key telephones 10-1 to 10-4, while the line-terminal map 32b shows correspondence between the ISDN subscriber's lines 13-1 to 13-3 and the ISDN telephones 14-1 to 14-5. As appreciated, the correspondence shown in FIG. 4 agrees with the correspondence shown in FIG. 1. For example, the general subscriber's line 11-1 is connected to the key telephone 10-1, and the ISDN subscriber's line 13-1 is connected to the ISDN telephones 14-1 to 14-3.

As shown in FIG. 5, each of the camp-on schedules 33-1 to 33-n shows a state of camp-on reservation (reservation of a connection or camp-on), i.e. correspondence between the telephones for which a camp-on is reserved. For example, in FIG. 5, the camp-on schedule 33-1 shows that a camp-on is reserved between the key telephone 10-1 and the ISDN telephone 14-1. Each of the camp-on schedules 33-1 to 33-n is produced in the control section 18 in a known manner when a camp-on reservation is requested by one of the telephones 10-1 to 10-4 and 14-1 to 14-5, and stored in the memory 19. The camp-on schedule is discarded when the corresponding reserved camp-on has been executed.

Figure 6:
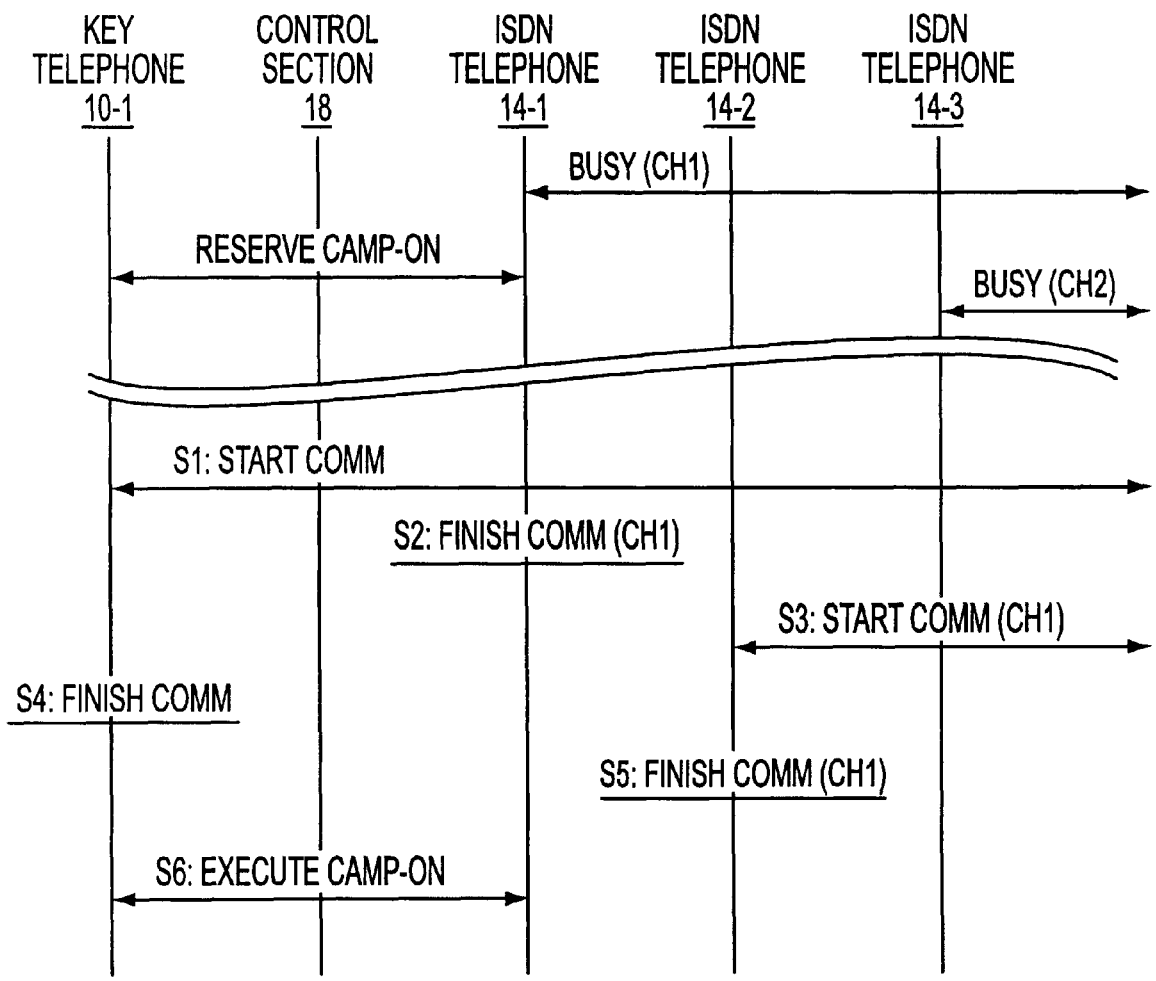
FIG. 6 is a sequence chart showing an operation of the exchange system.

Now, an operation of the foregoing exchange system will be described with reference to FIG. 6.

It is assumed that the key telephone 10-1 made a call to the ISDN telephone 14-1 while the ISDN telephone 14-1 was busy, so that the key telephone 10-1 reserved a camp-on with respect to the ISDN telephone 14-1 as shown in the camp-on schedule 33-1 in FIG. 5, that the ISDN telephone 14-1 is in communication with another telephone (not shown) using the channel 1 of the ISDN subscriber's line 13-1, and that the ISDN telephone 14-3 is in communication with another telephone (not shown) using the channel 2 of the ISDN subscriber's line 13-1.

<Step S1>

The key telephone 10-1 is off-hooked for starting communication, so that the key telephone 10-1 sends an off-hook signal to the control section 18. In response to receipt of the off-hook signal, the terminal managing section 18a sets "busy" for the key telephone 10-1 in the terminal idle/busy map 30a, and the channel managing section 18b sets "busy" for the general subscriber's line 11-1 in the channel idle/busy map 31a-1.

<Step S2>

The ISDN telephone 14-1 is on-hooked to finish communication. Therefore, the terminal managing section 18a sets "idle" for the ISDN telephone 14-1 in the terminal idle/busy map 30b, and the channel managing section 18b sets "idle" for the channel 1 of the ISDN subscriber's line 13-1 in the channel idle/busy map 31b-1.

<Step S3>

The ISDN telephone 14-2 makes a call using the channel 1 of the ISDN subscriber's line 13-1. Therefore, the terminal managing section 18a sets "busy" for the ISDN telephone 14-2 in the terminal idle/busy map 30b, and the channel managing section 18b sets "busy" for the channel 1 of the ISDN subscriber's line 13-1 in the channel idle/busy map 31b-1.

<Step S4>

The key telephone 10-1 is on-hooked to finish communication. Therefore, the terminal managing section 18a sets "idle" for the key telephone 10-1 in the terminal idle/busy map 30a, and the channel managing section 18bsets "idle" for the general subscriber's line 11-1 in the channel idle/busy map 31a-1. As a result, the key telephone 10-1 and the corresponding subscriber's line 11-1 are idle, and further, the ISDN telephone 14-1 is also idle. However, the channels 1 and 2 of the ISDN subscriber's line 13-1, which can be used by the ISDN telephone 14-1, are both busy. Thus, the camp-on control section 18c does not execute the reserved camp-on between the key telephone 10-1 and the ISDN telephone 14-1. <Step S5>

The ISDN telephone 14-2 is on-hooked to finish communication. Therefore, the terminal managing section 18a sets "idle" for the ISDN telephone 14-2 in the terminal idle/busy map 30b, and the channel managing section 18b sets "idle" for the channel 1 of the ISDN subscriber's line 13-1 in the channel idle/busy map 31b-1.

<Step S6>

Since the key telephone 10-1, the general subscriber's line 11-1, the ISDN telephone 14-1 and the channel 1 of the ISDN subscriber's line 13-1 are now all idle, the camp-on control section 18c executes the camp-on between the key telephone 10-1 and the ISDN telephone 14-1 according to the camp-on schedule 33-1 shown in FIG. 5. Specifically, the camp-on control section 18c calls up the ISDN telephone 14-1 and then the key telephone 10-1 so as to connect these telephones via the switch 15.

It is assumed that the control section 18 receives an off-hook signal from the ISDN telephone 14-2 during the execution of the camp-on, more specifically, during calling up the ISDN telephone 14-1. In this case, it may be arranged to either give priority to a call process for the ISDN telephone 14-2 over the execution of the camp-on or give priority to the execution of the camp-on over the call process.

Figure 7:
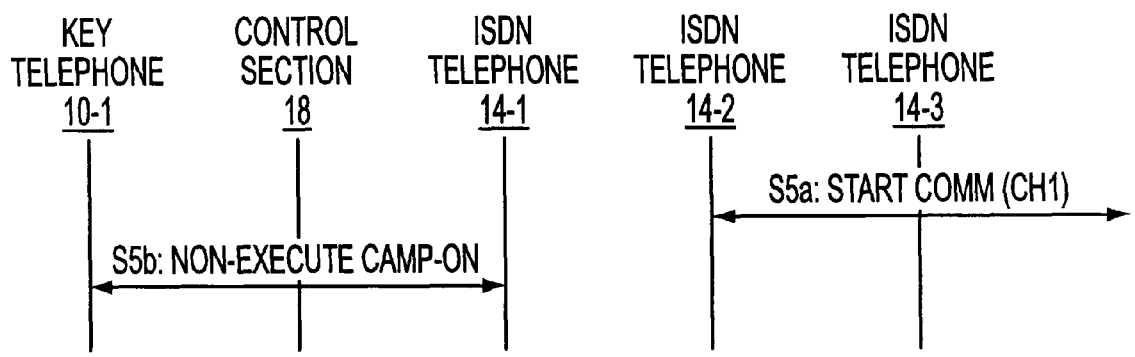

FIG. 7 is a sequence chart for explaining a procedure of giving priority to the call process over the execution of the camp-on.

It is assumed that step S5a occurs during calling up the ISDN telephone 14-1 according to the camp-on schedule 33-1 shown in FIG. 5.

<Step S5a>

The ISDN telephone 14-2 is off-hooked for starting communication, so that the control section 18 receives an off-hook signal from the ISDN telephone 14-2 and assigns thereto the channel 1 of the ISDN subscriber's line 13-1. Accordingly, the terminal managing section 18a sets "busy" for the ISDN telephone 14-2 in the terminal idle/busy map 30b, and the channel managing section 18b sets "busy" for the channel 1 of the ISDN subscriber's line 13-1.

<Step S5b>

Since the channels 1 and 2 of the ISDN subscriber's line 13-1 are both busy, the camp-on control section 18c stops the execution of the camp-on, i.e. the camp-on control section 18c stops calling up the ISDN telephone 14-1, so that no connection is made between the key telephone 10-1 and the ISDN telephone 14-1.

In contrast, it may be arranged that the channel managing section 18b sets "busy" for the channel 1 of the ISDN subscriber's line 13-1 upon starting the execution of the camp-on, i.e. upon starting calling up the ISDN telephone 14-1, so that the control section 18 notifies the ISDN telephone 14-2 that no channels are available for the ISDN telephone 14-2. With this arrangement, priority is given to the execution of the camp-on over the call process for the ISDN telephone 14-2.

It may also be arranged that the terminal managing section 18a and the channel managing section 18b set "busy" for the key telephone 10-1, the ISDN telephone 14-1, the general subscriber's line 11-1 and the channel 1 of the ISDN subscriber's line 13-1 upon starting the execution of the camp-on, i.e. upon starting calling up the ISDN telephone 14-1.

While the present invention has been described in terms of the preferred embodiment, the invention is not to be limited thereto, but can be embodied in various ways without departing from the principle of the invention as defined in the appended claims.

What is claimed is:

1. An exchange for executing a reserved connection between a first and a second terminal, said first terminal having a first channel for communication, said second terminal being one of a plurality of terminals having a second channel for communication shared by said plurality of terminals, said exchange comprising:

a first judging circuit for judging whether each of said first and second terminals is busy or idle;

a second judging circuit for judging whether said second channel is busy or idle; and an execution circuit for executing said reserved connection when said first judging circuit judges that said first and second terminals are both idle and said second judging circuit judges that said second channel is idle.

2. The exchange according to claim 1, wherein said execution circuit gives priority to starting of communication using said second channel by one of said plurality of terminals other than said second terminal, over execution of said reserved connection.

3. The exchange according to claim 1, wherein said execution circuit gives priority to execution of said reserved connection over starting of communication using said second channel by one of said plurality of terminals other than said second terminal.

4. The exchange according to claim 1, wherein said second channel is an ISDN channel.

5. A private branch exchange for executing a reserved connection between a first and a second terminal, said first terminal having a first channel for communication, said second terminal being one of a plurality of terminals having a second channel for communication shared by said plurality of terminals, said private branch exchange comprising:

a first judging circuit for judging whether each of said first and second terminals is busy or idle;

a second judging circuit for judging whether said second channel is busy or idle; and an execution circuit for executing said reserved connection when said first judging circuit judges that said first and second terminals are both idle and said second judging circuit judges that said second channel is idle.

* * * * *